US012633607B2

(12) United States Patent
Lee et al.

(10) Patent No.: US 12,633,607 B2
(45) Date of Patent: May 19, 2026

(54) BATTERY MODULE AND BATTERY PACK INCLUDING THE SAME

(71) Applicant: LG Energy Solution, Ltd., Seoul (KR)

(72) Inventors: Changhun Lee, Daejeon (KR); Junyeob Seong, Daejeon (KR); Jonghwa Choi, Daejeon (KR); Min Seop Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 700 days.

(21) Appl. No.: 17/615,435

(22) PCT Filed: Mar. 9, 2021

(86) PCT No.: PCT/KR2021/002927
    § 371 (c)(1),
    (2) Date: Nov. 30, 2021

(87) PCT Pub. No.: WO2021/221299
    PCT Pub. Date: Nov. 4, 2021

(65) Prior Publication Data
    US 2022/0231367 A1     Jul. 21, 2022

(30) Foreign Application Priority Data

Apr. 29, 2020    (KR) ........................ 10-2020-0052262

(51) Int. Cl.
    *H01M 50/209*     (2021.01)
    *H01M 10/02*      (2006.01)
    (Continued)

(52) U.S. Cl.
    CPC ....... *H01M 50/209* (2021.01); *H01M 50/143* (2021.01); *H01M 10/02* (2013.01);
    (Continued)

(58) Field of Classification Search
    CPC .......................... H01M 50/143; H01M 50/209
    See application file for complete search history.

(56) References Cited

U.S. PATENT DOCUMENTS 10,873,114 B2    12/2020  Ju et al.
2009/0220851 A1*  9/2009  Nakazawa ............ H01M 50/30
                                                        429/58

(Continued)

FOREIGN PATENT DOCUMENTS

CN        105531846 A      4/2016
CN        206349470 U      7/2017
                (Continued)

OTHER PUBLICATIONS

Search Report dated Feb. 1, 2023 from Office Action for Chinese Application No. 202180003639.3 issued Feb. 3, 2023. 3 pgs. (see p. 2, categorizing the cited references).

(Continued)

*Primary Examiner* — Matthew W Van Oudenaren
(74) *Attorney, Agent, or Firm* — Lerner David LLP

(57)          ABSTRACT

A battery module includes a battery cell stack in which a plurality of battery cells are stacked; a module frame for housing the battery cell stack; and a partition wall portion located between the battery cell stack and the module frame, wherein the partition wall portion includes a first partition wall member located between an upper portion of the battery cell stack and the module frame, and wherein the partition wall portion further includes at least one second partition wall member extending in a perpendicular direction from the first partition wall member.

15 Claims, 6 Drawing Sheets

(51) Int. Cl.
| | |
|---|---|
| *H01M 50/143* | (2021.01) |
| *H01M 50/20* | (2021.01) |
| *H01M 50/24* | (2021.01) |
| *H01M 50/264* | (2021.01) |
| *H01M 50/40* | (2021.01) |
| *H01M 50/463* | (2021.01) |

(52) U.S. Cl.
CPC ............ *H01M 50/20* (2021.01); *H01M 50/24* (2021.01); *H01M 50/264* (2021.01); *H01M 50/40* (2021.01); *H01M 50/463* (2021.01); *H01M 2220/20* (2013.01)

(56) References Cited

U.S. PATENT DOCUMENTS

| | | | |
|---|---|---|---|
| 2012/0082875 A1* | 4/2012 | Watanabe | H01M 10/6563 429/82 |
| 2015/0295212 A1 | 10/2015 | Hwangbo | |
| 2016/0163035 A1 | 6/2016 | Chang et al. | |
| 2016/0248070 A1 | 8/2016 | Ahn | |
| 2018/0269448 A1 | 9/2018 | Shimizu et al. | |
| 2018/0287113 A1 | 10/2018 | Son et al. | |
| 2019/0097205 A1 | 3/2019 | Xiao et al. | |
| 2019/0131596 A1 | 5/2019 | Yang et al. | |
| 2019/0181399 A1 | 6/2019 | Kaga et al. | |
| 2019/0221901 A1 | 7/2019 | Yoon et al. | |
| 2020/0067040 A1 | 2/2020 | Kim et al. | |
| 2020/0099114 A1* | 3/2020 | Ryu | H01M 10/615 |
| 2020/0350645 A1 | 11/2020 | Ju et al. | |
| 2020/0358153 A1 | 11/2020 | Tada et al. | |
| 2022/0126705 A1 | 4/2022 | He et al. | |

FOREIGN PATENT DOCUMENTS

| | | | | |
|---|---|---|---|---|
| CN | 110165117 | A | 8/2019 | |
| CN | 110832664 | A | 2/2020 | |
| CN | 110915019 | A | 3/2020 | |
| JP | 2014035918 | A | 2/2014 | |
| JP | 5978847 | B2 | 8/2016 | |
| JP | 2018-506168 | A | 3/2018 | |
| KR | 20150050314 | A | 5/2015 | |
| KR | 20150118473 | A | 10/2015 | |
| KR | 20190094921 | A | 8/2019 | |
| KR | 102036085 | B1 | 10/2019 | |
| KR | 102057232 | B1 | 12/2019 | |
| KR | 2020-0008624 | A | 1/2020 | |
| KR | 20200021609 | A | 3/2020 | |
| WO | 2019-150772 | A1 | 8/2019 | |
| WO | WO2019156324 | * | 8/2019 | |
| WO | WO-2019156324 | A1 * | 8/2019 | H01M 10/0525 |

OTHER PUBLICATIONS

International Search Report for PCTKR2021002927 dated Jul. 7, 2021, 2 pgs.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2021/002927, filed on Mar. 9, 2021, published in Korean, which claims the benefit of Korean Patent Application No. 10-2020-0052262 filed on Apr. 29, 2020 with the Korean Intellectual Property Office, the disclosures of which are incorporated herein by reference in their entireties.

TECHNICAL FIELD

The present disclosure relates to a battery module and a battery pack including the same, and more particularly, to a battery module having a partition wall structure, and a battery pack including the same.

BACKGROUND ART

As technology development and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle- or large-sized devices such as vehicles require high power and large capacity. The middle or large-sized battery module is preferably manufactured so as to have as small a size and weight as possible. Consequently, a prismatic battery, a pouch-shaped battery or the like, which can be stacked with high integration and has a small weight relative to capacity, is usually used as a battery cell of the middle or large-sized battery module. Therefore, a middle- or large-sized battery module in which a large number of battery cells are electrically connected is used, and there is an increasing need to install more battery cells in the battery module gradually.

Further, when the temperature of the secondary battery is higher than an appropriate temperature, the performance of the secondary battery may be deteriorated, and if it is severe, a cell event may occur. As an example, there is also a risk of occurrence of a thermal event such as an explosion or ignition. In particular, a large number of secondary batteries, that is, a battery module or a battery pack having a battery cell, can add up the heat generated from the large number of battery cells in a narrow space, so that the temperature can rise more quickly and severely. In the case of a battery module in which a large number of battery cells are stacked and a battery pack equipped with such a battery module, high output can be obtained, but as the number of battery cells increases, the possibility of explosion or ignition also increases. Moreover, in the case of a middle- or large-sized battery module included in a vehicle battery pack, it is frequently exposed to direct sunlight and can be subjected to high temperature conditions such as summer or desert areas. Consequently, when explosion or ignition occurs in the battery module, it is necessary to prevent the ignition from being transferred to another battery cell in a specific battery cell and so prevent further ignition from proceeding.

FIG. 1 is a perspective view of a conventional battery module. FIG. 2 is a cross-sectional view taken along the cutting line A-A' of FIG. 1. FIG. 3 is a view showing a cross-section of the battery module of FIG. 2 in which a cell event has occurred.

Referring to FIGS. 1 and 2, the conventional battery module 10 includes a battery cell stack 12 formed by stacking a plurality of battery cells 11, a lower frame 20 on which the battery cell stack 12 is disposed, and an upper plate 30 for covering the upper portion of the battery cell stack 12. In addition, for the insulation of the battery cell stack 12, the battery module 10 further includes an insulating layer 40 formed between the upper plate 30 and the battery cell stack 12.

In this case, the battery module 10 may further comprise a compression pad 50 located between battery cells adjacent to each other among the plurality of battery cells 11 and between the outermost battery cells of the battery cell stack 12 and the side surface portion of the lower frame 20. Accordingly, the compression pad 50 and the plurality of battery cells 11 may form one stack structure, and the compression pad 50 may also absorb the swelling of the battery cells 11. However, the conventional compression pad 50 cannot block ignition or induce a direction of ignition when a cell event such as ignition occurs.

As an example, referring to FIGS. 2 and 3, the conventional battery module 10 may be partially partitioned by the compression pad 50 in the battery cell stack 12. However, when a first cell event (cel) such as ignition occurs in a part of the plurality of battery cells, the compression pad 50 cannot block the ignition or induce the direction of ignition, so that even for some battery cells in which the first cell event (cel) has not occurred, a second cell event (ce2) to which the first cell event (cel) has propagated occurs.

Thereby, in the conventional battery module 10, when a cell event such as ignition occurs in some battery cells of the battery cell stack 12, an ignition phenomenon may propagate to other battery cells included in the battery module 10, and thus, there is a problem in that the cell event may become more serious.

Therefore, in the trend that a demand such as an increase in capacity for a battery module continues, it is practically necessary to develop a battery module that can satisfy these various requirements together while improving cooling performance.

DETAILED DESCRIPTION OF THE INVENTION

Technical Problem

It is an object of the present disclosure is to provide a battery module having a partition wall structure, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there can be provided a battery module comprising: a battery cell stack in which a plurality of battery cells are stacked; a module frame for housing the battery cell stack; and a partition wall portion located between the battery cell stack and the module frame, wherein the partition wall portion comprises a first partition wall member located between an upper portion of the battery cell stack and the module frame, and wherein the partition wall portion further comprises at least one second partition wall member extending in a perpendicular direction from the first partition wall member.

The at least one second partition wall member may extend up to a lower portion of the module frame, and the battery cell stack may be located partitioned into a first stack and a second stack by the partition wall portion.

The partition wall portion may block a cell event generated in the first stack from being diffused to the second stack.

The at least one second partition wall member may include at least two second partition wall members that may be located separately from each other so as to have equal intervals in a stacking direction of the battery cell stack.

The at least one second partition wall member may include at least two second partition wall members that may be located symmetrically with reference to a center of the battery cell stack.

The at least one second partition wall member may be located between an outermost battery cell of the plurality of battery cells and a side portion of the module frame, or may be located between battery cells adjacent to each other among the plurality of battery cells.

Two of the at least one second partition wall member are respectively located between outermost battery cells of the plurality of battery cells and side portions of the module frame, and one of the at least one second partition wall member is located between battery cells adjacent to each other among the plurality of battery cells.

The partition wall portion may be composed of a functional material having flame retardancy and insulating properties.

The module frame may include a U-shaped frame that houses the battery cell stack and has an opened upper portion, and an upper plate that covers the battery cell stack in the opened upper portion of the U-shaped frame.

The first partition wall member is located between the upper plate and the battery cell stack, and two of the at least one second partition wall member may be respectively located between outermost battery cells of the plurality of battery cells and side portions of the U-shaped frame, and one of the at least one second partition wall member may be located between battery cells adjacent to each other among the plurality of battery cells.

In addition, there can be provided a battery pack comprising the battery module according to one embodiment of the present disclosure.

Advantageous Effects

According to the embodiments of the present disclosure, a battery module can be provided in which the battery module includes a partition wall structure to thereby block cell events occurring in some battery cells or induce a propagation direction.

Effects of the present disclosure may not be limited to the above-mentioned effects, and other effects of the present disclosure will be clearly understandable to those having ordinary skill in the art from the disclosures provided below together with accompanying drawings.

DETAILED DESCRIPTION OF THE EMBODIMENTS

Figure 1:
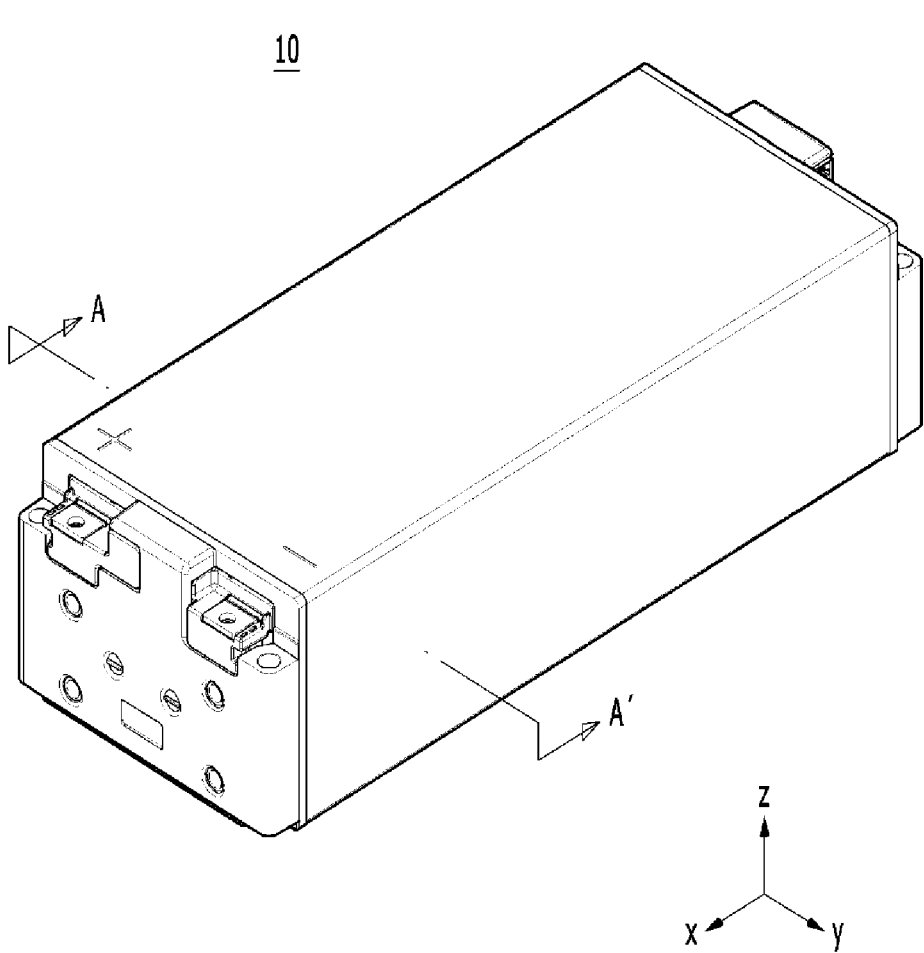
FIG. 1 is a perspective view of a conventional battery module.
Figure 2:
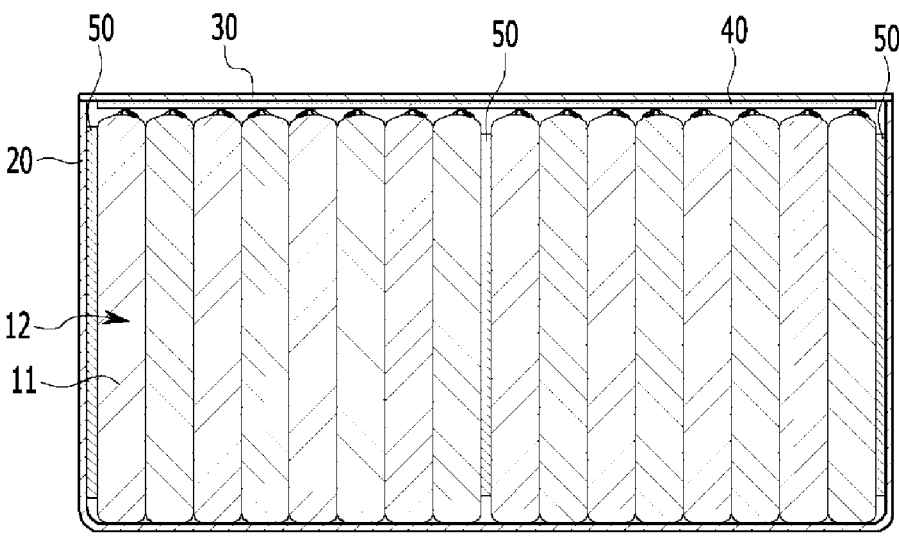
FIG. 2 is a cross-sectional view taken along the cutting line A-A' of FIG. 1.
Figure 3:
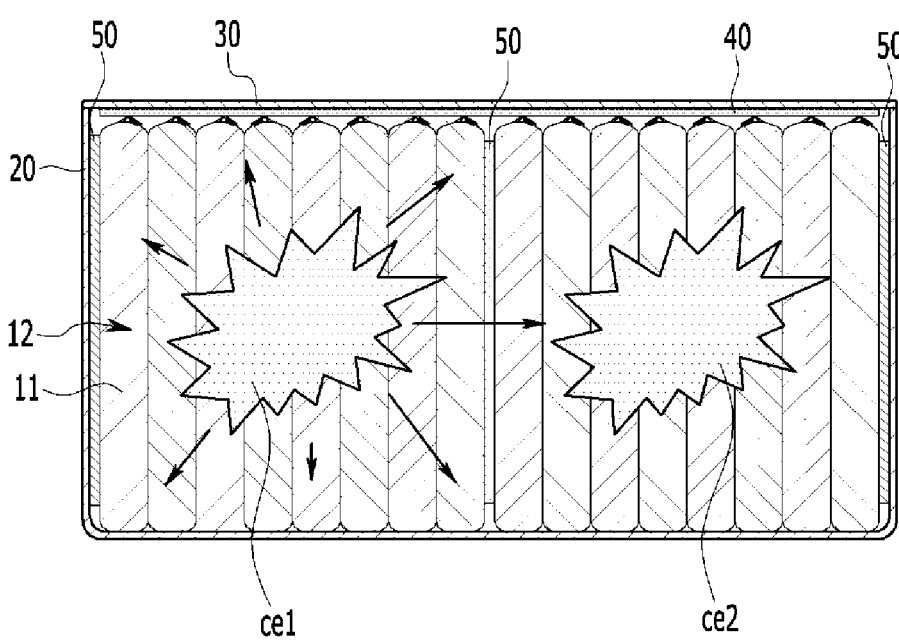
FIG. 3 is a view showing a cross-section of the battery module of FIG. 2 in which a cell event has occurred.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, the electrode for a secondary battery according to an embodiment of the present disclosure will be described. However, the description herein is made based on the front surface of the front and rear surfaces of the battery module, without being limited thereto, and even in the case of the rear surface, the same or similar contents may be described.

Figure 4:
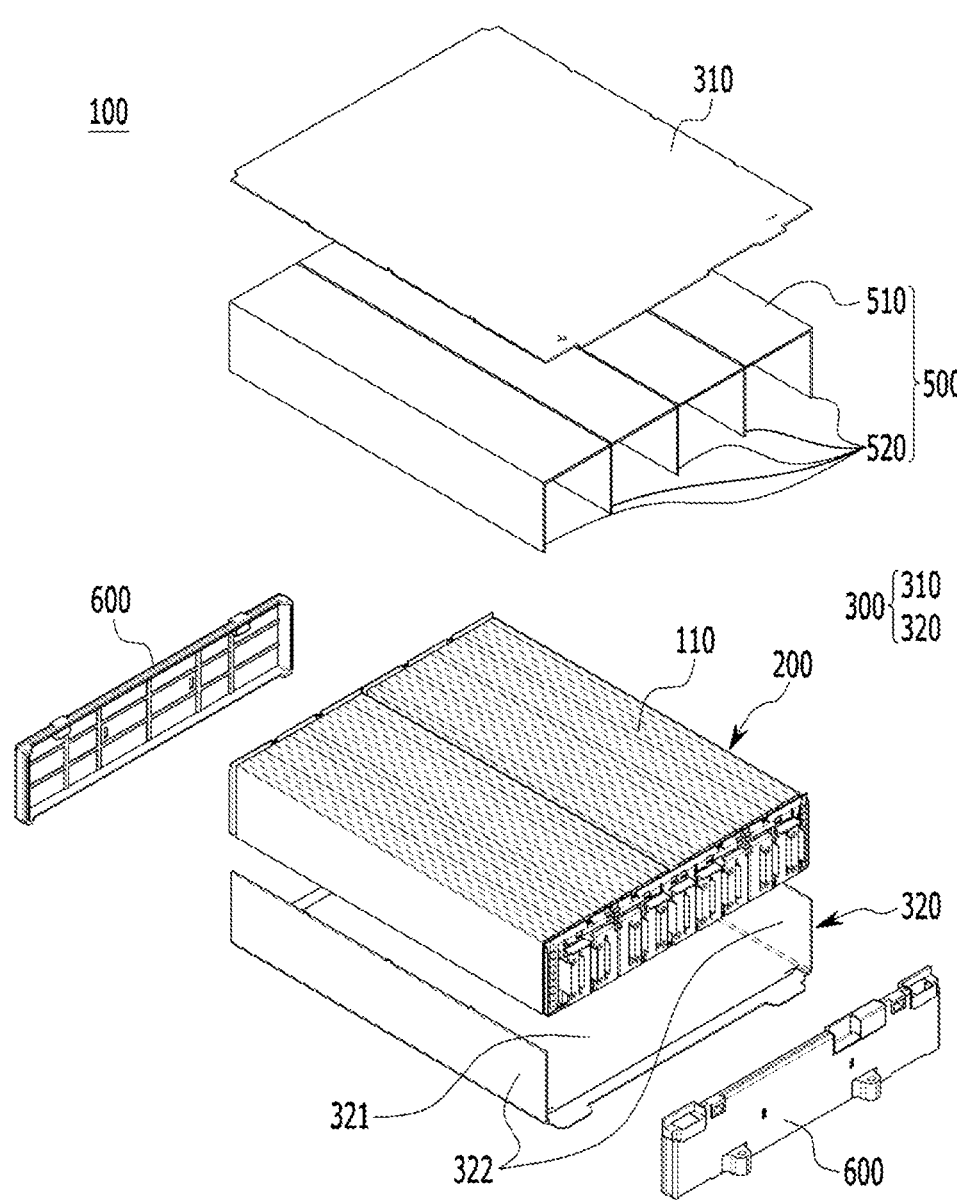
FIG. 4 is an exploded perspective view showing a battery module according to an embodiment of the present disclosure.
Figure 5:
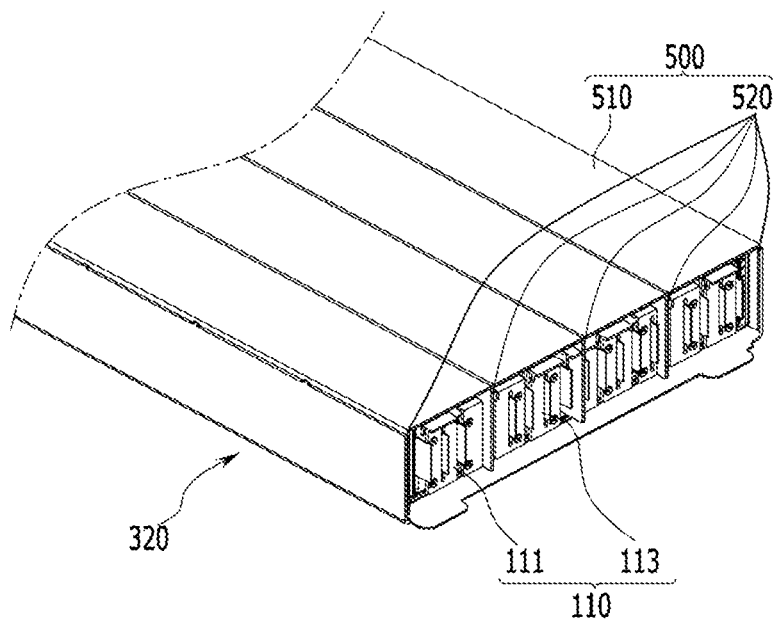
FIG. 5 is a partial perspective view showing a state in which the components of the battery module of FIG. 4 are combined.

FIG. 4 is an exploded perspective view showing a battery module according to an embodiment of the present disclosure. FIG. 5 is a partial perspective view showing a state in which the components of the battery module of FIG. 4 are combined. The partial perspective view of FIG. 5 shows a state in which the upper plate is removed from the battery module of FIG. 4.

Referring to FIGS. 4 and 5, a battery module 100 according to an embodiment of the present disclosure includes a battery cell stack 200 in which a plurality of battery cells 110 are stacked, a module frame 300 that houses the battery cell stack 200, a partition wall portion 500 located between the battery cell stack 200 and the module frame 500, and end plates 600 located on the front and rear surfaces of the battery cell stack 200.

The module frame 300 includes a U-shaped frame 320 including a bottom portion 321 and a side portion 321, of which an upper surface, a front surface and a rear surface are opened, and an upper plate 310 that covers an upper portion of the battery cell stack 200. However, the module frame 300 is not limited thereto, and can be replaced with a frame having another shape such as a mono frame surrounding the battery cell stack 200, except for the L-shaped frame or the front and rear surfaces.

The battery cell 110 is preferably a pouch-type battery cell. The battery cell can be manufactured by housing the electrode assembly in a pouch case of a laminate sheet including a resin layer and a metal layer, and then heat-sealing the sealing portion of the pouch case. Such a battery cell 110 may be composed of a plurality of cells, and the plurality of battery cells 110 form a battery cell stack 200 that is stacked so as to be electrically connected to each other. In particular, as shown in FIG. 4, a plurality of battery cells 110 may be stacked along a direction parallel to the x-axis.

However, the battery module 100 according to an embodiment of the present disclosure may be a large area module in which the battery cell stack 120 includes a relatively larger number of battery cells than the conventional battery module. In the case of a large area module, the length of the battery module in the horizontal direction becomes relatively long. Here, the length of the battery module in the horizontal direction may mean the length in the direction in which the battery cells are stacked. Therefore, when the battery module 100 corresponds to a large area module, as the number of battery cells 100 contained in the battery cell stack 200 increases, the heat generated may also increase. Therefore, the battery module 100 needs to prevent an additional cell event from being occurred as a cell event, that is generated in a specific battery cell among the plurality of battery cells 110, propagates to other battery cells.

Here, the cell event is an emergency situation that occurs in at least one battery cell among the plurality of battery cells 110 contained in the battery module 10, which involves leakage of a battery cell or a battery module, mechanical damage to battery cells, and occurrence of a thermal event that is ignited in response to a temperature rise, and the like. In particular, the thermal event includes the occurrence of a flame and/or a venting gas by the ignition of the battery cell. The thermal event can be particularly diffused in the inside of the battery pack including the battery module 100 and the battery module 100. Thus, there is a risk of raising the temperature of the surrounding battery module or the battery cells 110 in the battery module 100, thereby causing a chain of additional cell events.

Referring to FIGS. 4 and 5, the partition wall portion 500 according to an embodiment of the present disclosure includes a first partition wall member 510 located between the upper portion of the battery cell stack 200 and the module frame 300, and includes at least one second partition wall member 520 extending in a vertical direction from the first partition wall member 510. Here, the partition wall portion 500 may be composed of a functional material having flame retardancy and insulating properties. Consequently, the partition wall portion is excellent in insulation property and flame retardancy when a cell event occurs, and so it can prevent the cell event from becoming severe and inhibit the diffusion of cell events and induce a direction of progression.

The first partition wall member 510 may have a shape corresponding to the upper plate 310 of the module frame 300. Preferably, the first partition wall member 510 has a shape corresponding to the flat plate, but may have a size corresponding to the upper portion of the battery cell stack 200.

The second partition wall member 520 can be extended from the first partition wall member 510 to the lower portion 321 of the module frame 300. Accordingly, a part of the plurality of battery cells 110 contained in the battery cell stack 200 may be spatially closed by the first partition wall member 510 and the second partition wall member 520.

Further, the second partition wall member 520 may have a shape corresponding to the side portion 322 of the module frame 300. Further, the second partition wall member 520 may have a shape corresponding to the battery cell 110 of the battery cell stack 200. Preferably, the second partition wall member 520 has a shape corresponding to the flat plate, but may have a size corresponding to an upper surface or a lower surface of the battery cell 110.

The partition wall portion 500 may include at least two second partition wall members 520, and the second partition wall members 520 may be located separately from each other so as to have a predetermined interval in the stacking direction of the battery cell stack. As an example, the second partition wall members 520 may be located separately from each other so as to have equal intervals in the stacking direction of the battery cell stack. As an example, the second partition wall members 520 may be located symmetrically with reference to the center of the battery cell stack 200.

As an example, the second partition wall members 520 are spaced apart in the stacking direction of the battery cell stack, but a region, where the battery cells 110 in the central region are located, may be located so that the second partition wall members 520 are spaced apart by a narrower interval than the battery cells 110 in the outer region. As the heat generated from the battery cell 110 is relatively less cooled in the battery cell 110 in the central region than in the battery cell 110 in the outer region, the probability of occurrence of a thermal event is high, so that the battery module 100 may more effectively control cell events.

In addition, the partition wall portion 500 may be configured such that at least one second partition wall member 520 is located between the outermost battery cell of the battery cell stack 200 and the module frame side portion 322, or is located between the battery cells adjacent to each other among the plurality of battery cells 110.

As an example, the partition wall portion 500 may be configured such that two second partition wall members 520 are respectively located between the outermost battery cells of the battery cell stack 200 and the module frame side 322, and at least one second partition wall member 520 is located between the battery cells adjacent to each other among the plurality of battery cells.

As an example, the module frame 300 of the battery module 100 may include a U-shaped frame 320 that houses the battery cell stack 200 and has an opened upper portion, and an upper plate 310 that covers the battery cell stack 200 in the opened upper portion of the U-shaped frame. At this time, the first partition wall member 510 is located between the upper plate 310 and the battery cell stack 200, two second partition wall members 520 are respectively located between the outermost battery cells of the battery cell stack 200 and the module frame side portion 322, and at least one second partition wall member 520 may be located between the battery cells adjacent to each other among the plurality of battery cells 110.

Thereby, the partition wall portion 500 can protect the outermost battery cells vulnerable to external impact in the battery cell stack 200, and also can more effectively control cell events of the battery cell stack 200.

Figure 6:
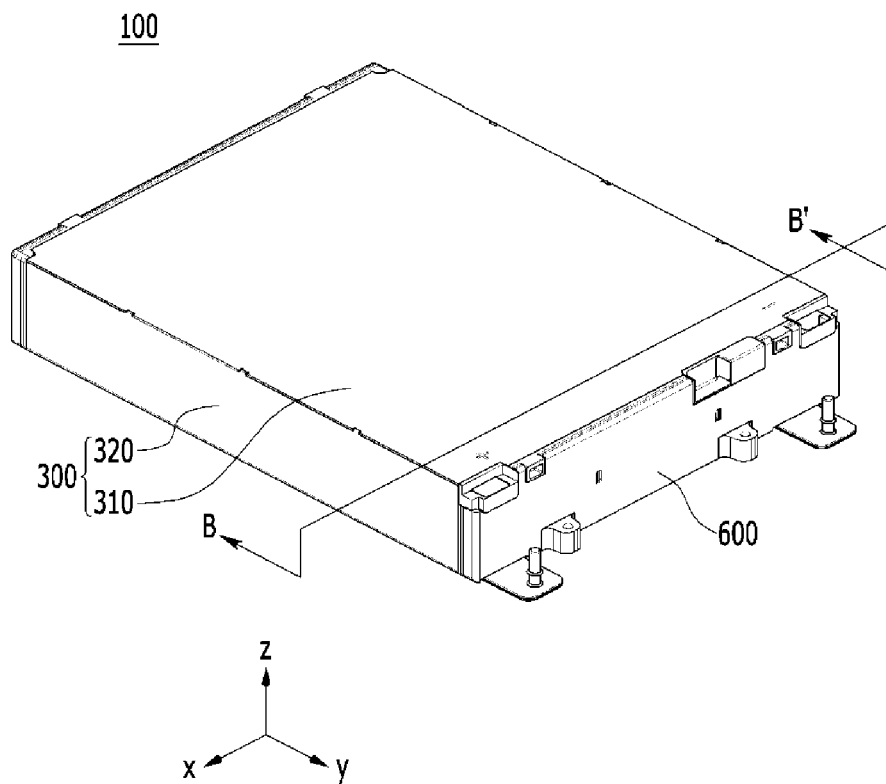
FIG. 6 is a perspective view showing a state in which the components constituting the battery module of FIG. 4 are combined.
Figure 7:
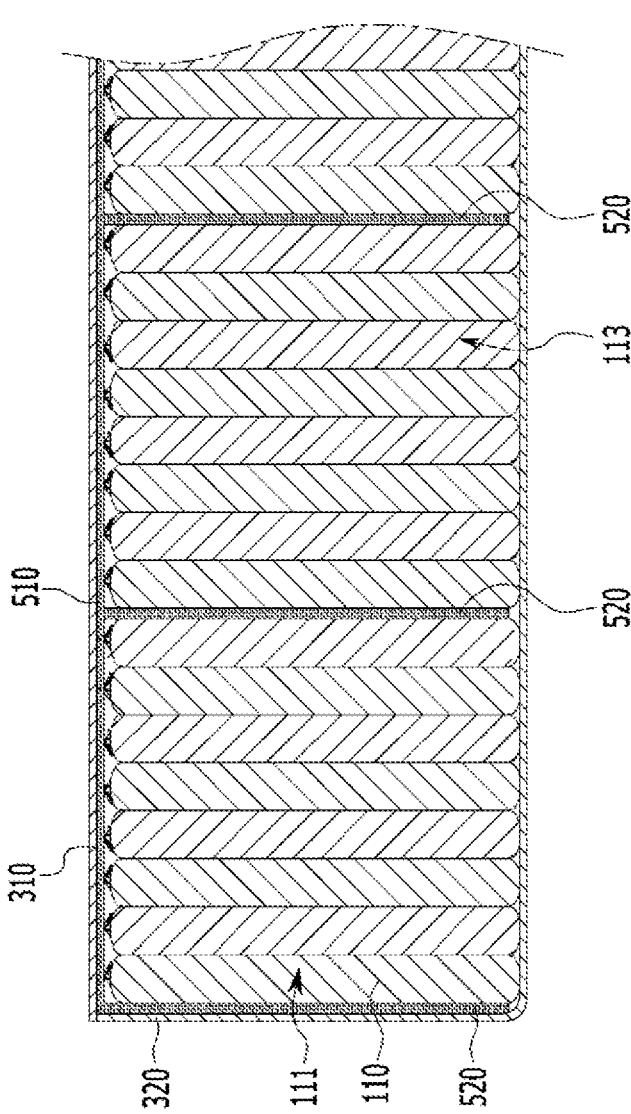
FIG. 7 is a cross-sectional view showing a partial area of the cross-section taken along the cutting line B-B' of FIG. 6.

FIG. 6 is a perspective view showing a state in which the components constituting the battery module of FIG. 4 are combined. FIG. 7 is a cross-sectional view showing a partial area of the cross-section taken along the cutting line B-B' of FIG. 6. In particular, FIG. 7 is an enlarged view showing a partial area of the battery cell stack 200 contained in a cross section taken along the cutting line B-B' of FIG. 6.

Referring to FIGS. 4, 5, and 7, the battery module 100 according to an embodiment of the present disclosure includes a partition wall portion 500, so that a plurality of battery cells 110 in the battery module 100 can be partitioned. As an example, the battery cell stack 200 may be partitioned into a first stack 111 and a second stack 113 by the partition wall portion 500. At this time, the first stack 111 and the second stack 113 are electrically connected, but can be spatially separated. Preferably, the first stack 111 and the second stack 113 are spatially separated from each other, but each space can be closed.

Figure 8:
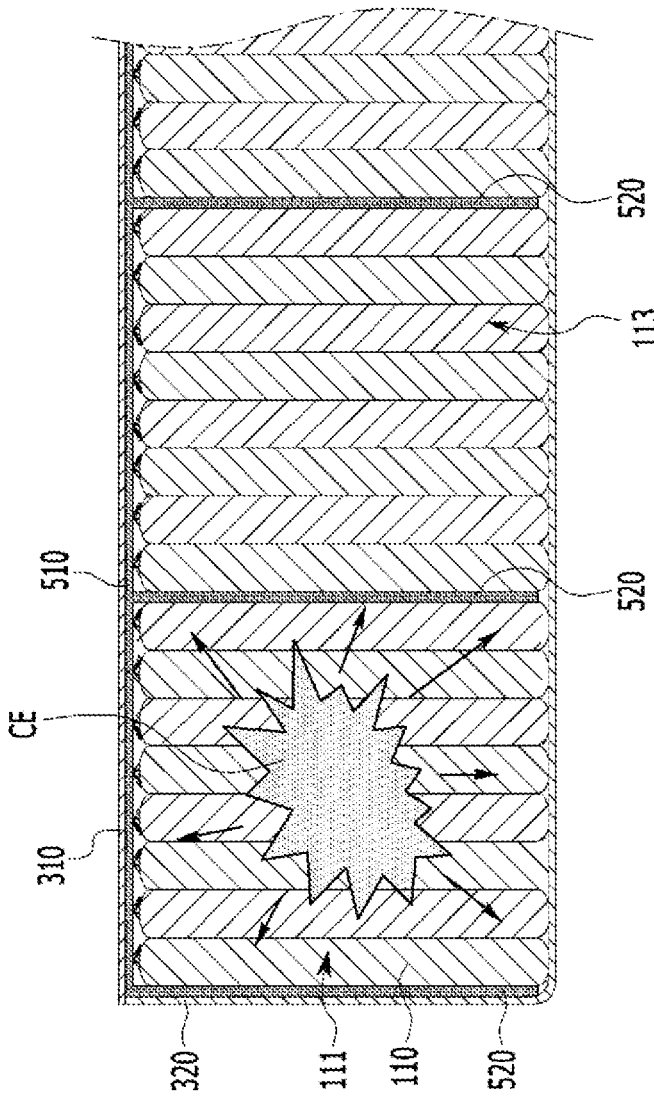
FIG. 8 is a cross-sectional view showing the battery module of FIG. 7 in which a cell event has occurred.

FIG. 8 is a cross-sectional view showing the battery module of FIG. 7 in which a cell event (CE) has occurred. Referring to FIGS. 7 and 8, when a cell event (CE) is occurred in the first stack 111, the partition wall portion 500 may block the cell event (CE) from being diffused to the outside of the partition wall portion 500. As an example, even if a cell event (CE) is occurred in the first stack 111, the partition wall portion 500 may block the cell event (CE) from being diffused to the outside of the module frame 300 or the partition in which the second stack 113 is located. Thus, the partition wall portion 500 can have resistance to flames and venting gases generated in the cell event (CE), thereby preventing the cell event (CE) from being diffused to the outside.

Consequently, even if a cell event occurs in a specific battery cell 110, it can prevent diffusion to other battery cells 110 and thus reduce the risk of occurrence of an additional cell event. Further, when a cell event occurs in a specific battery cell 110, it is possible to induce the progression direction of the cell event only for the compartment in which the specific battery cell 110 is included, and thus prevent cell events from becoming severe. In addition, for the compartment including the specific battery cell 110 in which the cell event has occurred, the source in which the cell event has occurred can be quickly tracked and thus, product maintenance can be facilitated.

If necessary, the battery module 100 of the present disclosure may further include a thermally conductive resin layer (not shown) between the battery cell stack 200 and the partition wall portion 500 as a cooling means. Alternatively, a thermally conductive resin layer (not shown) may be further included between the partition wall portion 500 and the module frame 300. Alternatively, a thermally conductive resin layer (not shown) may be further included between the battery cell stack 200 and the lower portion of the module frame 321. Thereby, the battery module 100 of the present disclosure can prevent a cell event from occurring.

The one or more battery modules according to the present embodiment described above can be mounted together with various control and protection systems such as a battery management system (BMS) and a cooling system to form a battery pack.

The above-mentioned battery module or the battery pack can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
200: battery cell stack
300: module frame
500: partition wall portion
600: end plate

The invention claimed is:

1. A battery module comprising:
a battery cell stack in which a plurality of battery cells are stacked, wherein each of the plurality of battery cells has a respective battery case;
a module frame for housing the battery cell stack; and
a partition wall portion located between the battery cell stack and the module frame,
wherein the partition wall portion comprises a first partition wall member located between a top surface of the battery cell stack and an upper plate of the module frame, and
wherein the partition wall portion further comprises a plurality of second partition wall members extending in a vertical dimension from the first partition wall member, wherein a group of the plurality of battery cells are disposed between any adjacent ones of the plurality of second partition wall members,
wherein the second partition wall members are configured to block flow of a gas.

2. The battery module of claim 1,
wherein at least one second partition wall member extends up to a lower portion of the module frame, and the battery cell stack is partitioned into a first stack and a second stack by the partition wall portion.

3. The battery module of claim 2,
wherein the partition wall portion blocks a cell event generated in the first stack from being diffused to the second stack.

4. The battery module of claim 1,
wherein at least one second partition wall member comprises at least two second partition wall members that are located separately from each other so as to have equal intervals in a stacking direction of the battery cell stack.

5. The battery module of claim 1,
wherein at least one second partition wall member comprises at least two second partition wall members that are located symmetrically with reference to a center of the battery cell stack.

6. The battery module of claim 1,
wherein at least one second partition wall member is located between an outermost battery cell of the plurality of battery cells and a side portion of the module frame.

7. The battery module of claim 1,
wherein two of the plurality of second partition wall members are respectively located between outermost battery cells of the plurality of battery cells and side portions of the module frame, and one of the plurality of second partition wall members is located between battery cells adjacent to each other among the plurality of battery cells.

8. The battery module of claim 1, wherein the partition wall portion is composed of a functional material having flame retardancy and insulating properties.

9. The battery module of claim 1, wherein the module frame comprises a U-shaped frame that houses the battery cell stack and has an opened upper portion, and the upper plate that covers the battery cell stack in the opened upper portion of the U-shaped frame.

10. The battery module of claim 9, wherein the first partition wall member is located between the upper plate and the battery cell stack, and two of the plurality of second partition wall members are respectively located between outermost battery cells of the plurality of battery cells and side portions of the U-shaped frame, and one of the plurality of second partition wall members is located between battery cells adjacent to each other among the plurality of battery cells.

11. A battery pack comprising the battery module as set forth in claim 1.

12. The battery module of claim 1, wherein at least one second partition wall member is located between battery cells adjacent to each other among the plurality of battery cells.

13. The battery module of claim 1, wherein leads of the plurality of battery cells are elongated along respective longitudinal dimensions, and wherein the longitudinal dimensions of the leads extend outwardly in a lateral dimension orthogonal to the vertical dimension.

14. The battery module of claim 1, wherein the second partition wall members isolate a first stack of the battery cell stack from a second stack of the battery cell stack, so as to block flow of the gas.

15. The battery module of claim 13, wherein the first partition wall member defines a plane extending along both a stacking direction of the plurality of battery cells and the lateral dimension.

\* \* \* \* \*